United States Patent
Nay et al.

(10) Patent No.: US 12,508,911 B2
(45) Date of Patent: Dec. 30, 2025

(54) ASSEMBLY COMPRISING A GENERATOR AND ELECTRIC MOTORS, FOR A VEHICLE AIR-CONDITIONING OR REFRIGERATION SYSTEM

(71) Applicant: MOTEURS LEROY SOMER, Angouleme (FR)

(72) Inventors: Nicolas Nay, Jauldes (FR); Sébastien Charenton, Roullet-Saint-Estephe (FR); Stéphane Dufau, Angouleme (FR); Matthieu Robin, Ruelle sur Touvre (FR)

(73) Assignee: MOTEURS LEROY-SOMER, Angouleme (FR)

( * ) Notice: Subject to any disclaimer, the term of this patent is extended or adjusted under 35 U.S.C. 154(b) by 715 days.

(21) Appl. No.: 16/961,064

(22) PCT Filed: Dec. 21, 2018

(86) PCT No.: PCT/EP2018/086572
§ 371 (c)(1),
(2) Date: Jul. 9, 2020

(87) PCT Pub. No.: WO2019/137803
PCT Pub. Date: Jul. 18, 2019

(65) Prior Publication Data
US 2020/0398669 A1    Dec. 24, 2020

(30) Foreign Application Priority Data

Jan. 9, 2018   (FR) ...................... 1850159

(51) Int. Cl.
*B60L 1/00*   (2006.01)
*B60H 1/32*   (2006.01)

(52) U.S. Cl.
CPC ............ *B60L 1/003* (2013.01); *B60H 1/3222* (2013.01); *B60H 1/3229* (2013.01); *B60H 2001/3294* (2013.01)

(58) Field of Classification Search
CPC .... B60H 1/322; B60H 1/3222; B60H 1/3208; B60H 2001/3294; B60H 1/3229; B60L 1/003
See application file for complete search history.

(56) References Cited

U.S. PATENT DOCUMENTS 4,760,300 A     7/1988 Yoshida et al.
5,477,936 A  * 12/1995 Sugioka .................... B60L 3/04
                                                    180/68.5

(Continued)

FOREIGN PATENT DOCUMENTS

CN       205319817 U    6/2016
EP       3 170 688 A1   5/2017

(Continued)

OTHER PUBLICATIONS

Mar. 13, 2019 International Search Report issued in International Patent Application PCT/EP2018/086572.

(Continued)

*Primary Examiner* — Tavia Sullens
(74) *Attorney, Agent, or Firm* — Oliff PLC

(57) ABSTRACT

An assembly, having a generator and electric motors, for a vehicle air-conditioning or cooling system, having: a compressor intended to be driven by a heat engine, a top-up electric motor for driving the compressor when the latter is not or cannot be driven by the heat engine, a generator with permanent magnets having a shaft which can be driven in rotation by the heat engine, the generator and the top-up electric motor being disposed on this shaft, one or more condenser and/or evaporator electric motors of a vehicle air-conditioning or cooling system, said electric motors (Continued)

Figure 1A:
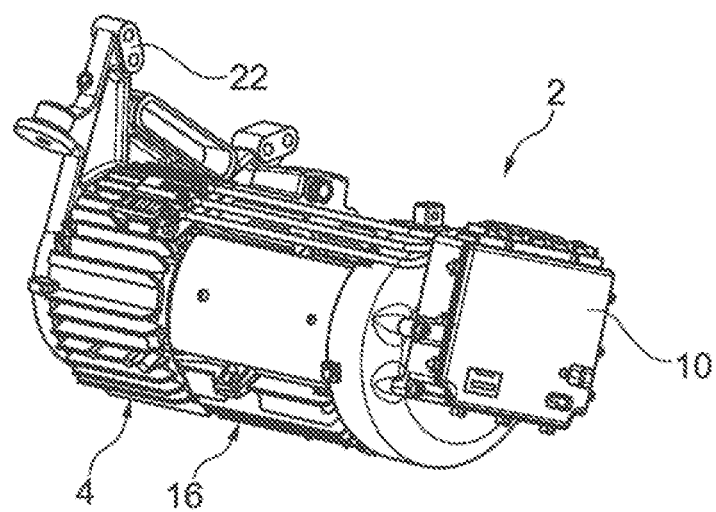

being configured to be powered by a direct current, the generator powering the electric motor or motors through a converter configured to supply a direct current, notably a low-voltage controller.

17 Claims, 4 Drawing Sheets

(56) References Cited

U.S. PATENT DOCUMENTS

| | | | | |
|---|---|---|---|---|
| 2007/0130950 A1* | 6/2007 | Serkh | ................ | B60H 1/00428 |
| | | | | 123/198 R |
| 2014/0026599 A1* | 1/2014 | Rusignuolo | ........ | B60H 1/00428 |
| | | | | 62/243 |
| 2014/0137590 A1* | 5/2014 | Chopko | ................ | F04B 35/002 |
| | | | | 62/323.1 |
| 2015/0202943 A1* | 7/2015 | Giraud | ................ | B60H 1/3208 |
| | | | | 62/243 |
| 2017/0349078 A1 | 12/2017 | Dziuba et al. | | |

FOREIGN PATENT DOCUMENTS

| | | | |
|---|---|---|---|
| FR | 2 934 433 A1 | 1/2010 | |
| WO | WO-2008090949 A1 * | 7/2008 | ........... B60H 1/3222 |
| WO | 2009/147966 A1 | 12/2009 | |
| WO | 2013/072892 A2 | 5/2013 | |
| WO | 2014/013457 A1 | 1/2014 | |

OTHER PUBLICATIONS

Mar. 23, 2022 Office Action issued in European Patent Application No. 18 833 658.0.

* cited by examiner

ASSEMBLY COMPRISING A GENERATOR AND ELECTRIC MOTORS, FOR A VEHICLE AIR-CONDITIONING OR REFRIGERATION SYSTEM

The present invention relates to the production of electricity from an assembly comprising a heat engine and an electricity production device, for the powering of one or more electric motors, notably for a cooling or air-conditioning system of a vehicle or of a vehicle trailer.

Depending on the regions of the world, it is sometimes necessary to be able to power all of the cooling or air-conditioning system from an available electrical network (also referred to as an electrical grid), for example in the case where the vehicle is stopped.

The applications WO 2014/013457 and WO 2014/013457 relate to assemblies in which the generator and the top-up electric motor (also referred to as an auxiliary electric motor) driving the compressor are not disposed on one and the same shaft.

The patent application EP 3 170 688 discloses an assembly in which the generator directly powers the electric motor or motors, the power supply voltage of the electric motor or motors being the output voltage of the generator. To this end, the electric motors necessarily use alternating current, notably at 50 Hz or 60 Hz.

However, such motors can be relatively costly.

There is therefore a need to simplify and facilitate driving the cooling or air-conditioning system, to reduce the cost of the electricity production device and to increase the efficiency of the system to reduce its fuel consumption.

There is also a need to increase the compactness of the assembly and reduce its bulk.

The invention notably aims to address all or some of these needs, and, thus, its subject matter is an assembly comprising:
- a compressor intended to be driven by a heat engine, notably a diesel heat engine,
- a top-up electric motor for driving the compressor when the latter is not or cannot be driven by the heat engine,
- a generator with permanent magnets having a shaft which can be driven in rotation by the heat engine, the generator and the top-up electric motor being disposed on this shaft,
- one or more electric motors of condensers and/or of evaporators of a vehicle air-conditioning or cooling system, said electric motors being configured to be powered with direct current, the generator powering the electric motor or motors through a converter configured to supply a direct current, notably a low-voltage controller.

The generator and the electric motor are disposed on one and the same mechanical shaft. There is thus the benefit of a more compact and more efficient assembly, without the need for a mechanical transmission.

The generator and the top-up electric motor can be contained in a common housing. It is thus possible to mount the generator and the top-up electric motor in an existing vehicle, in place of a pre-existing top-up motor. As a variant, they are each mounted in a housing, the assembly then being able to comprise two housings.

The housing can be a housing comprising apertures, in order to favor the ventilation thereof. It can comprise an integrated cooling system, for example an air cooling system. It can comprise two fans each disposed on either side of the generator and of the motor, at each of the ends of the assembly. The air can in this case enter through the ends and exit through the middle, through apertures formed in the housing between the generator and the top-up electric motor. As another variant, the housing can be cooled by a liquid, for example water. The housing used can be an IP 23 or IP 21 seal-tight housing or, as a variant, an IP 55 or IP 54 or IP 56, even IP 65 seal-tight housing.

The invention makes it possible to improve the efficiency of the assembly, which can be particularly advantageously for vehicles in which the heat engine must have a limited power. That can be imposed by law, in order to limit pollution. The powering of the electric motor or motors by the generator makes it possible to improve the effectiveness and efficiency of the assembly, for example compared to a system with pulley and belt linkage.

The assembly can comprise said heat engine, notably a diesel heat engine, for the driving of the compressor. The heat engine and the electric motor or motors can belong to a cooling or air-conditioning system of a vehicle.

The duly composed assembly allows for the following two operations for a vehicle equipped with said assembly. On the road, the heat engine drives the compressor directly or via a coupling, and drives the generator which supplies electricity to the electric motors of the condensers and/or evaporators. When stopped, otherwise referred to as being in stand-by mode, it is the top-up electric motor which drives the cooling compressor and the condenser and evaporator motors can be powered by the generator itself driven by the top-up electric motor.

The top-up electric motor can power both the compressor and the generator which powers the electric motor or motors. One advantage of such a configuration is that the wiring thereof is simplified. This operation can notably apply when the heat engine is stopped, notably when a vehicle comprising the assembly is docked.

The compressor is preferably mechanically driven, notably with pistons. A mechanical compressor with pistons can be more effective than a rotary, hermetic, screw or "scroll" compressor. The driving can be done by pulley and belt. The assembly may not have a compressor driven by an electric motor, in on-road operating mode at the very least.

The power supply voltage of the electric motor or motors of condensers and/or of evaporators can be the output voltage of the converter, notably a low voltage, for example a direct voltage of 48 V. The use of direct current electric motors makes it possible to reduce their cost, and therefore the cost price of the assembly.

The input voltage of the converter can be a low voltage, for example a voltage of 33 V.

The generator can be synchronous. The generator can comprise a stator, which can comprise a stack of plates. The stack of plates can comprise several bundles of plates, angularly offset relative to one another. The rotor of the generator can comprise permanent magnets. The rotor of the generator can comprise permanent magnets, it then being for example a flux concentration rotor or a rotor with magnets buried in a rotor mass. The permanent magnets can be held by end rings disposed on each side of the rotor mass. These rings can be made of aluminum. The generator can comprise an eight-pole rotor. Advantageously, the bulk of the motor and therefore of the assembly is reduced by increasing the number of poles. A number of four poles is also possible. The stator of the generator can be wound on teeth, comprising, for example, 12 teeth, or be distributed, comprising 48 notches for example. The outer diameter of the stator is, for example, of the order of 200 mm.

The generator can, for example, operate at a frequency chosen from the 37.5 to 60 Hz range.

It can supply an output voltage lying within the 330 V AC to 660 V AC range or within the 12 V AC to 36 V AC range.

The top-up electric motor can be an asynchronous motor. It can be an induction machine, comprising a squirrel cage rotor. Such a configuration makes it possible to improve the electromagnetic performance of the motor, while giving it an acceptable bulk. The rotor of the top-up electric motor can, for example, comprise a two-material rotor, which makes it possible to improve the power and the efficiency. The rotor can notably comprise a stack of magnetic plates comprising notches. The notches receive aluminum injected under pressure, thus forming bars linked to one another at the end of the stack of plates by short-circuit rings. The aluminum can be replaced by copper, notably to reduce the electricity resistivity of the bars, in order to improve the efficiency and/or the magnetic power gain.

The top-up electric motor can be a 4-pole motor.

The speed of rotation of the top-up electric motor is, for example, 1460 rpm.

The stators of the generator and of the top-up electric motor can be identical, notably in size and/or in structure.

The controller is configured to transform an alternating input voltage into a direct output voltage. The controller can be configured to transform an input voltage of between 330 V AC and 660 V AC into an output voltage, for example, of 48 V DC. As a variant, the controller can be configured to transform an input voltage of between 12 V AC and 36 V AC into an output voltage, for example, of 48 V DC.

The shaft can be magnetic or amagnetic. It can for example be produced by machining a steel log.

It can comprise at least four parts, one intended to receive, for example, a pulley, one to receive the generator, one to receive the top-up electric motor, and one to receive, for example, a fan, and, for example, a speed sensor or a permanent magnet.

The shaft can comprise a serration. "Serration" is understood to mean a deformation of the material of the shaft, notably by pressure, making it possible to limit the surface stresses of the shaft. Such a serration of the shaft makes it possible to limit the efforts of insertion of the rotor on the shaft. The serration can comprise a longitudinal groove, extending over all or part of the length of the shaft, for example over all of its length.

The serration can be situated on the part of the shaft intended to receive the generator. As a variant or in addition, the serration can be situated on the part of the shaft intended to receive the top-up electric motor.

The serration can be created by striking the shaft using a serration tool, and more particularly two serration tools, one lower and the other upper. A serration tool can comprise two chisels defining the length of the serration on the shaft. Two tools can be used, one lower positioned on a press table and the other upper fixed onto the top of the press which strikes the shaft. It is notably possible to use a nongeared press. To effect the serration, an operator can first of all position the shaft on the lower serration tool, which can be positioned on the press table. Then, a strike command is given to the press, and the upper tool strikes the shaft. Through the impact of the lower and upper tools, four deformations are created simultaneously on the shaft. The material is pushed back and forms notching that is sought.

The top-up electric motor can also be used to power a direct current charger, notably to power a battery for example, and equipment inside the vehicle, for example a controller or even a human-machine interface.

The top-up electric motor can also power a top-up heating system, for example a heating and/or de-icing system of a vehicle compartment. It then operates in generator mode, as neither regulated nor controlled energy source. This operation can notably apply when the heat engine is operating, notably when a vehicle comprising the assembly is on the road, that is to say that the heat engine is operating and powers the compressor.

As a variant, when the vehicle is on the road and the heat engine is operating, the top-up electric motor can be stopped.

The heat engine can be a diesel engine. The heat engine and the electric motor or motors can belong to a cooling or air-conditioning system of a vehicle. The heat engine can be different from the engine used to propel the vehicle.

The heat engine can drive the shaft of the generator through a pulley and belt system. Such a pulley and belt drive allows for the output frequency of the generator to be adjusted to the speed of the heat engine in order to allow the use of electric motors of fans that can be used on the network directly without performance degradation.

The assembly can comprise a rocker switch device for powering the top-up electric motor, making it possible to power the latter from the electrical network. The rocker switch device can comprise one or more switches for that purpose. The rocker switch device can be configured so that, when the heat engine is stopped, the condenser and/or evaporator electric motors are powered by the generator, and the compressor is driven by the top-up electric motor. In this case, the generator is driven by the top-up electric motor. Thus, the top-up electric motor powers both the compressor and the generator, which powers the electric motor or motors.

The rocker switch device can be configured to be able to be engaged only when the vehicle is stopped. The or each switch can comprise one or more electronic components. The or each switch can be produced by any suitable means and for example using one or more electromechanical switches or switches with semiconductors, for example with contactor(s), relay(s), thyristor(s), triac(s), IGBT(s), MOSFET(s) or bipolar transistor(s).

Such a configuration offers better fuel economy. When the vehicle is stopped, the diesel engine need not operate.

The external electrical network can be a 400 V and 50 Hz network or, as a variant, a 460 V and 60 Hz electrical network. Thus, the assembly can operate on the electrical networks around the world, being able to be adapted regardless of the place of use and the characteristics of the local electrical network.

The condenser and/or evaporator electric motor or motors can each be used to drive a fan and be condenser and/or evaporator motors.

The absence of any mechanical drive of the condenser and/or evaporator fan or fans makes it possible to increase the energy efficiency of the assembly.

The assembly can comprise a single condenser, or, as a variant, several condensers. The assembly comprises, for example, two condensers. The assembly can comprise a single evaporator, or, as a variant, several evaporators. The assembly can comprise, for example, two or more evaporators.

The condenser and/or evaporator motor or motors can be configured to be powered by a direct current.

They can be single-speed, two-speed or variable-speed motors, which can make it possible to maintain near aeraulic performance regardless of the speed of the heat engine. It is thus possible to limit the power absorbed in case of increase of the speed of the heat engine. The speeds of rotation of the heat engine are, for example, as follows: 1100 rpm, 1250 rpm, 1600 rpm, 2000 rpm and 2200 rpm.

One or at least one of the condenser and/or evaporator motors can comprise a four-pole rotor, which allows for operation at low speed with low consumed power. One or at least one of the condenser and/or evaporator motors can, as a variant, comprise another polarity, such as, for example, 2, 6 or 8 poles.

The condenser and/or evaporator motor or motors can comprise a fan at each of the free ends of their shaft.

The assembly can also comprise a compressor mechanically driven by the heat engine. The drive can be done by pulley and belt.

The assembly need not have batteries.

Another subject matter of the invention is a method for operating an assembly as described above, in which:
- either (i) the compressor and the generator are driven by the heat engine, notably when a vehicle bearing the assembly is on the road, the generator then being able to supply electricity to the electric motors of the condensers and/or evaporators, notably through a converter configured to supply a direct current, notably a low-voltage controller,
- or (ii) the compressor is driven by the top-up electric motor, notably when a vehicle bearing the assembly is stopped, the condenser and evaporator motors then being able to be powered by the generator, the generator being also driven by the top-up electric motor.

Figure 1B:
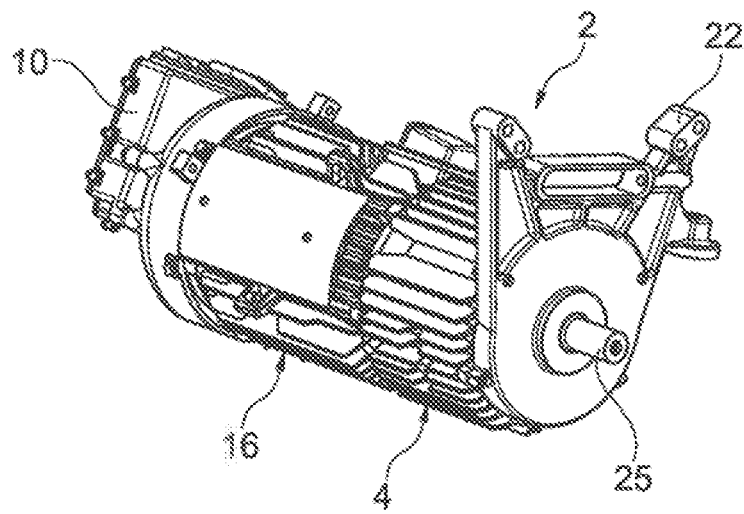
Figure 1C:
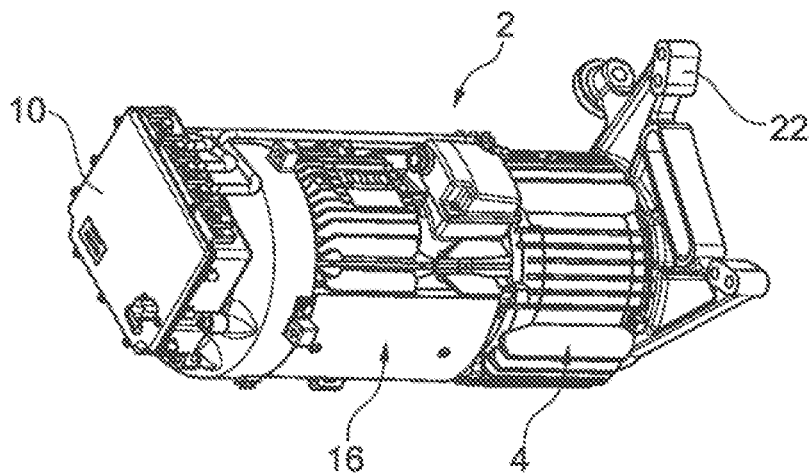
Figure 2:
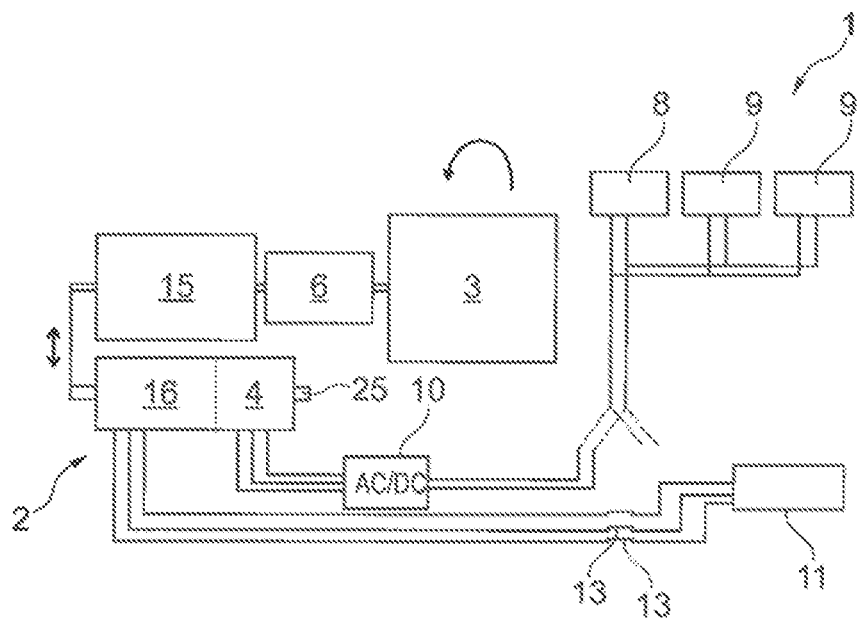
Figure 3:
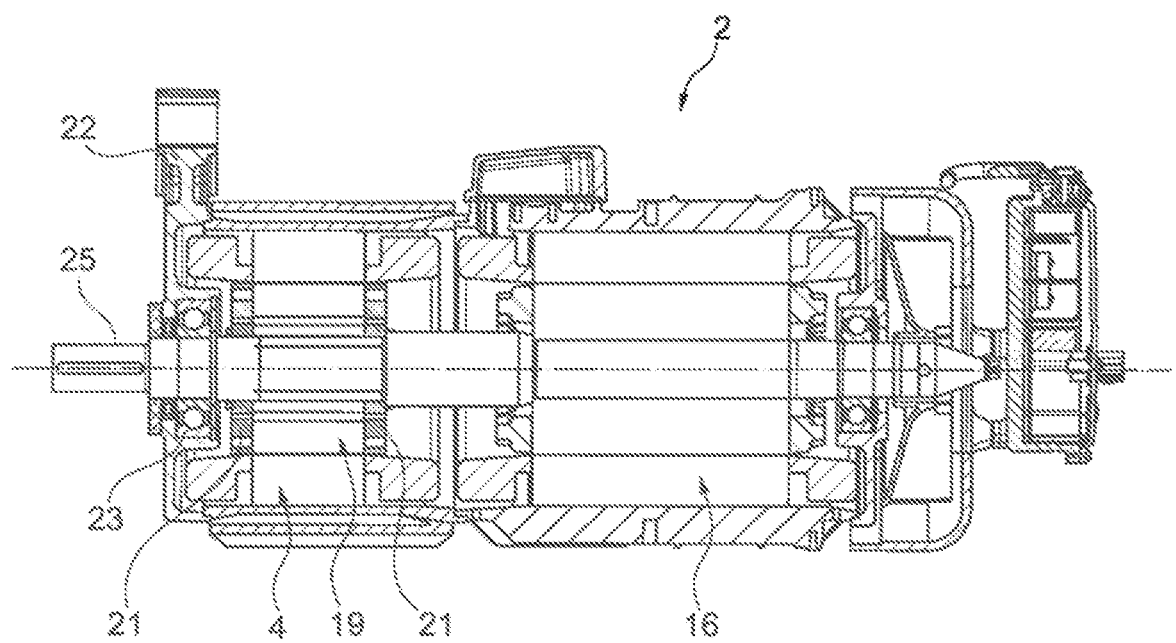
Figure 4:
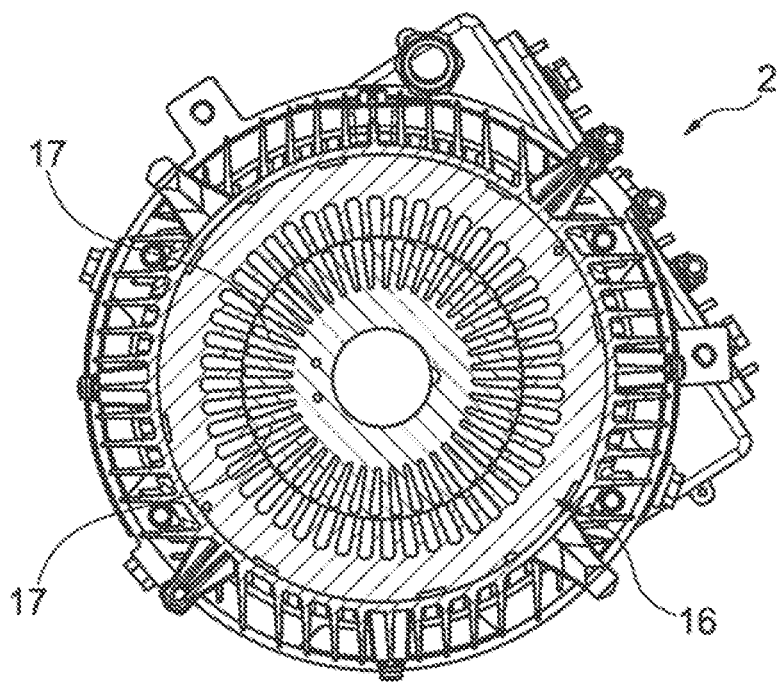
Figure 5:
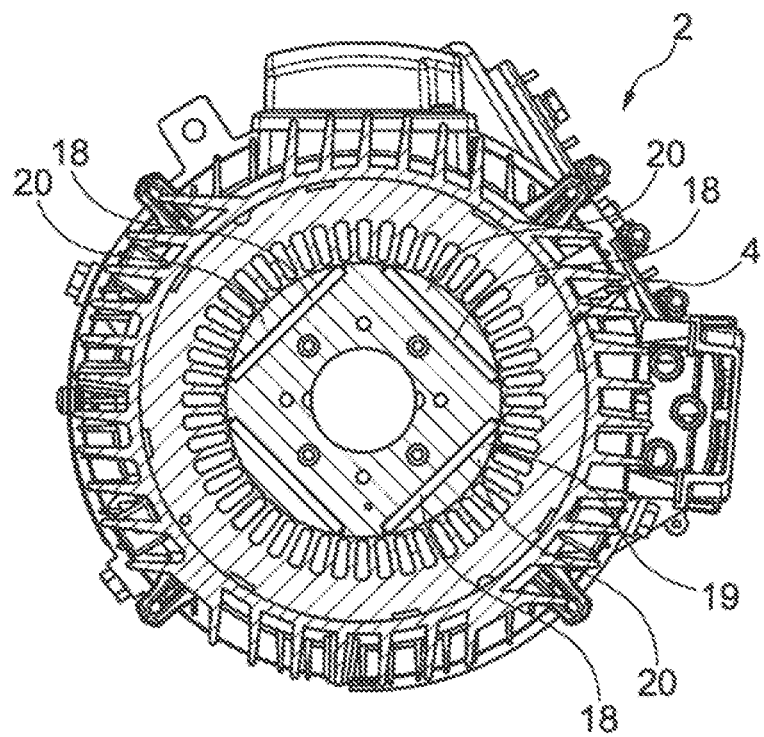
Figure 6:
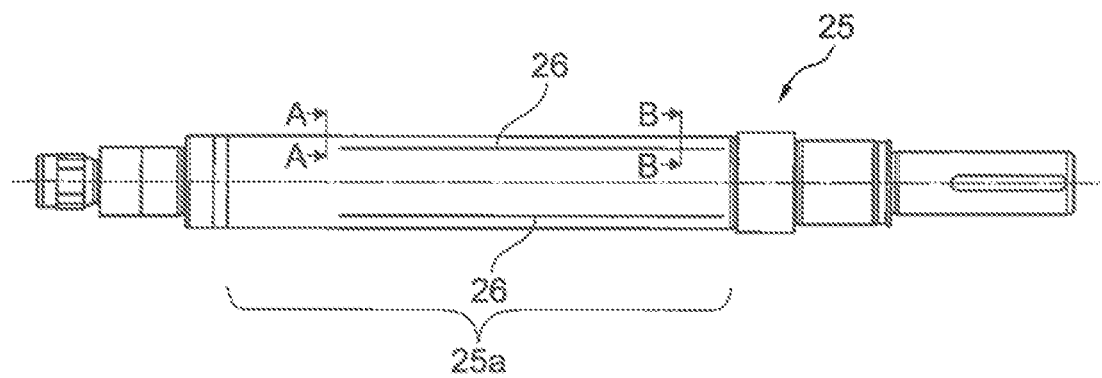
Figure 7A:
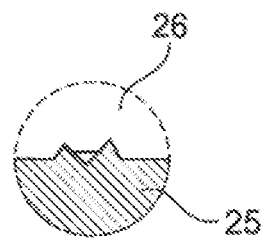
Figure 7B:
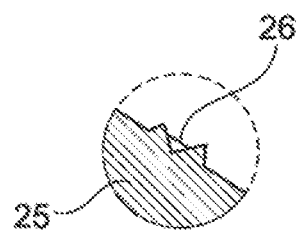
Figure 8A:
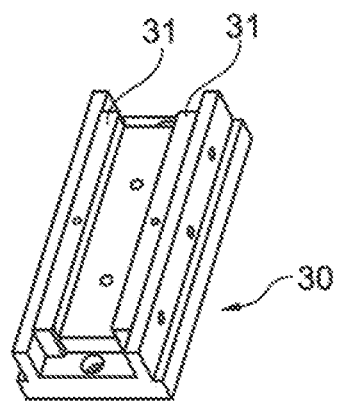
Figure 8B:
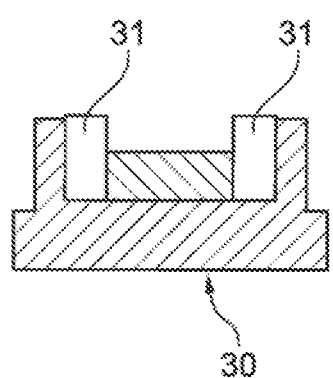

The invention will be able to be better understood on reading the following detailed description of a nonlimiting exemplary implementation thereof, and on studying the attached drawing, in which:

FIGS. 1a to 1c are perspective views of an electricity production device of an assembly, embedded or not, produced in accordance with the invention, FIG. 2 schematically represents this assembly, FIG. 3 is a schematic view, in longitudinal cross-section, of the device of FIGS. 1a to 1c, FIGS. 4 and 5 are schematic views, in transverse cross-section, respectively of the top-up electric motor and of the generator, FIG. 6 is a side view of the shaft of the generator and of the top-up electric motor, FIGS. 7a and 7b are detail views, in transverse cross-section, of the shaft of FIG. 6, respectively along A-A and B-B, FIG. 8a is a schematic and partial perspective view of the serration tool which can be used, and FIG. 8b is a view thereof in transverse cross-section.

FIGS. 1a to 1c and 2 show an assembly 1 comprising, on the one hand, a heat engine 3, and, on the other hand, an electricity production device 2 having a generator 4 whose shaft 25 can be driven in rotation by the heat engine 3.

The assembly 1 is, for example, embedded on a vehicle. In the example described, the heat engine 3 is a diesel engine.

The assembly also comprises electric motors 8, 9 of an air-conditioning or cooling system of the vehicle or of the trailer of the vehicle, powered by the electricity production device 2. In the example described, the assembly comprises a condenser motor 8 and two evaporator motors 9. Their number could of course be different without parting from the scope of the present invention. There could notably be two condenser motors and two evaporator motors.

These electric motors 8, 9 are configured to be powered by a direct voltage, 48 V DC in the example described.

The electricity production device 2 is configured so that the generator powers the electric motors through a converter 10 configured to supply a direct current, notably a low-voltage controller.

The power supply voltage of the electric motors is the output voltage of the converter 10. The input voltage of the converter can be a low voltage, for example a voltage of 33 V. The input voltage of the converter is the output voltage of the generator 4.

The assembly comprises a compressor 15 driven by the heat engine 3 via a coupling 6. The driving can be done by pulley and belt. The assembly thus has no electrically-driven compressor.

The assembly also comprises a top-up electric motor 16 for driving the compressor 15 when the latter is not or cannot be driven by the heat engine. The driving can be done by pulley and belt.

The top-up electric motor 16 is disposed on the same shaft 25 as the generator, so that the top-up electric motor and the generator can be contained in a common housing, or not. In the exemplary embodiment described, the assembly comprises two housings, one for the generator and one for the top-up electric motor. The housing or housings can be air-cooled or water-cooled.

The top-up electric motor 16 can be powered from the electrical network 11. Despite the presence of the top-up electric motor 16, the assembly has no electrically-driven compressor when the assembly is in on-road operating mode.

In the variant embodiment illustrated in FIG. 1, the generator 4 is driven by the heat engine 3 via a mechanical link involving the coupling 6, the compressor 15 and the shaft 25.

In the example described, the assembly also comprises a rocker switch device for powering the top-up electric motor, comprising switches 13 making it possible to power the top-up electric motor from the electrical network 11.

When the heat engine is stopped, the condenser and/or evaporator electric motors are powered by the generator, and the compressor is driven by the top-up electric motor. In this case, the generator is driven by the top-up electric motor. Thus, the top-up electric motor powers both the compressor and the generator which powers the electric motor or motors.

As can be seen in FIG. 3, the device 2 comprises a single end of shaft 25. Furthermore, the generator comprises a flange 22 making it possible to dismantle a rolling bearing 23 disposed at the front of the generator. The device 2 is, in the example described, of IP55 class.

Moreover, the heat engine 3 drives the shaft 25 of the generator 4 by pulley and belt, which allows the output frequency of the generator to be adjusted to the speed of the heat engine. The heat engine 3 can drive the generator 4 at a variable speed. For example, when the charge of the generator is low, the speed of rotation of the heat engine 3 is relatively low, and when the charge of the generator 3 increases, the speed of the heat engine 3 can be increased.

FIGS. 3 and 4 illustrate an exemplary embodiment in which the top-up electric motor 16 comprises a rotor formed by a stack of magnetic plates comprising notches 17. The notches receive aluminum injected under pressure, thus forming bars linked to one another at the end of the stack of plates by short-circuit rings. The aluminum can be replaced by copper, notably in order to reduce the electrical resistivity of the bars, in order to improve the efficiency and/or the magnetic power gain.

FIGS. 3 and 5 illustrate an exemplary embodiment in which the generator 4 comprises a stator with distributed winding. In the example described, it comprises a rotor 19 with permanent magnets 18 buried under the surface of the poles 20, as illustrated in FIG. 5. The magnets can be of ferrite or rare earth (for example NeFeB) type. The rotor illustrated comprises four poles 20, but could comprise 6 or 8 thereof. In another variant that is not illustrated, the magnets could be disposed on the surface.

The permanent magnets 18 are held by end rings 21 disposed on each side of the rotor mass. These rings can be made of aluminum.

This generator for example has a power of 3.6 kW at an operating speed of 1800 rpm.

The shaft 25 is represented on its own in FIG. 6. In the example described, it comprises a part 25*a* bearing serrations 26, as illustrated in FIGS. 7*a* and 7*b*. This part is intended to receive the generator and/or the top-up electric motor.

The serration is created by striking the shaft by means of a serration tool, and more particularly two serration tools, one lower and the other upper. A serration tool 30 comprises two chisels 31 defining the length of the serration on the shaft 25, as illustrated in FIGS. 8*a* and 8*b*.

The invention claimed is:

1. An assembly for a vehicle air-conditioning or cooling system, comprising:
    a compressor intended to be driven by a heat engine,
    an auxiliary electric motor for driving the compressor when the compressor is not or cannot be driven by the heat engine,
    a generator with permanent magnets having a shaft which can be driven in rotation by the heat engine, the generator and the auxiliary electric motor being disposed on this shaft,
    one or more electric motors of condensers and/or of evaporators of the vehicle air-conditioning or cooling system, said electric motors being direct current variable-speed motors configured to be powered by a direct current, the generator powering the one or more electric motors of condensers and/or of evaporators through a converter configured to supply the direct current, wherein the generator is configured to supply an output voltage of between 12 V alternating current and 36 V alternating current or between 330 V alternating current and 660 V alternating current such that the converter is configured to transform the output voltage into a direct current output voltage.

2. The assembly as claimed in claim 1, wherein the output voltage is between 12 V alternating current and 36 V alternating current.

3. The assembly as claimed in claim 1, wherein the output voltage is between 330 V alternating current and 660 V alternating current.

4. The assembly as claimed in claim 1, the output voltage being a 33 V alternating current.

5. The assembly as claimed in claim 1, a power supply voltage of the one or more electric motors of condensers and/or of evaporators being an output voltage of the converter.

6. The assembly as claimed in claim 1, wherein the generator is synchronous.

7. The assembly as claimed in claim 1, the auxiliary electric motor comprising a squirrel cage rotor.

8. The assembly as claimed in claim 1, the shaft comprising a serration.

9. The assembly as claimed in claim 1, the heat engine and the one or more electric motors of condensers and/or of evaporators belonging to the vehicle cooling or air-conditioning system.

10. The assembly as claimed in claim 1, wherein the generator and the auxiliary electric motor are contained in a common housing.

11. The assembly as claimed in claim 1, comprising a rocker switch device for powering the auxiliary electric motor, making it possible to supply the auxiliary electric motor from an electrical grid.

12. The assembly as claimed in claim 11, the rocker switch device being configured so that, when the heat engine is stopped, the one or more electric motors of condensers and/or of evaporators are powered by the generator, and the compressor is driven by the auxiliary electric motor.

13. The assembly as claimed in claim 1, wherein the compressor has a mechanical drive.

14. The assembly as claimed in claim 1, wherein the auxiliary electric motor comprises an eight-pole rotor.

15. The assembly as claimed in claim 14, wherein the one or more electric motors of condensers and/or of evaporators are each used to drive a fan.

16. A method for operating the assembly as claimed in claim 1, comprising:
    driving the compressor and the generator with the heat engine, and
    supplying electricity to the one or more electric motors of condensers and/or evaporators with the generator.

17. A method for operating the assembly as claimed in claim 1, comprising:
    driving the compressor with the auxiliary electric motor, and
    powering the one or more electric motors of condensers and/or of evaporators with the generator, the auxiliary electric motor also driving the generator.

* * * * *